United States Patent [19]

McKinney et al.

[11] Patent Number: 4,500,664

[45] Date of Patent: Feb. 19, 1985

[54] STABILIZED CARBOXYL-CONTAINING ETHYLENE INTERPOLYMERS

[75] Inventors: Osborne K. McKinney; David P. Flores, both of Lake Jackson, Tex.

[73] Assignee: The Dow Chemical Company, Midland, Mich.

[21] Appl. No.: 528,024

[22] Filed: Aug. 31, 1983

Related U.S. Application Data

[63] Continuation-in-part of Ser. No. 321,668, Nov. 16, 1981, abandoned.

[51] Int. Cl.³ ............................................... C08K 5/52
[52] U.S. Cl. ..................................... 524/119; 524/140; 524/141; 524/239; 524/289; 524/291; 524/321
[58] Field of Search ............... 524/119, 321, 140, 141, 524/239, 289, 291

[56] References Cited

U.S. PATENT DOCUMENTS

| | | | |
|---|---|---|---|
| 3,427,280 | 2/1969 | Imhof | 260/41 |
| 3,493,537 | 2/1970 | Salyer et al. | 524/321 |
| 3,639,513 | 1/1972 | Sadakata et al. | 260/878 |
| 4,036,719 | 7/1977 | Lyons | 524/128 |
| 4,136,069 | 1/1979 | Vachon et al. | 524/321 |
| 4,252,924 | 2/1981 | Chatterjee | 526/318 |
| 4,254,014 | 3/1981 | McEwen et al. | 524/119 |
| 4,312,803 | 1/1982 | Markezich et al. | 524/119 |
| 4,427,813 | 1/1984 | McEwen et al. | 524/119 |

*Primary Examiner*—Veronica P. Hoke
*Attorney, Agent, or Firm*—W. J. Lee

[57] ABSTRACT

The antioxidative degradation process, and/or color stability of carboxyl-containing ethylene interpolymers is improved by incorporating therein at least one aromatic bis(organophosphorus) compound, with or without a hindered phenol antioxidant and/or a dicarboxylic acid.

16 Claims, No Drawings

STABILIZED CARBOXYL-CONTAINING ETHYLENE INTERPOLYMERS

CROSS-REFERENCE TO RELATED APPLICATION

This application is a continuation-in-part of Ser. No. 321,668 filed Nov. 16, 1981, now abandoned.

BACKGROUND OF THE INVENTION

Interpolymers of ethylene containing pendent carboxyl groups are inherently highly susceptible to thermal oxidation. This inherent instability translates into significantly reduced production prime rates due to oxidative gels (crosslinked polymer), polymer discoloration, and degradation by-products which can corrode process equipment. This instability also seriously limits the useful life of the polymer's end-products, e.g., films, coatings, adhesives, and the like.

U.S. Pat. No. 4,254,014 discloses the preparation of bis(cyclic phosphite) compounds and their use as thermal stabilizers for polycarbonates. The stabilizers are also identified as aromatic bis(dioxaphosphorinane) compounds represented by the formula:

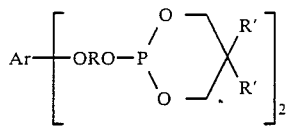

wherein Ar is a divalent aromatic radical having each of its valences (valence bonds) on an aromatic ring; each R is individually a divalent aliphatic radical and each R' is individually hydrogen or a monovalent organic radical, provided that the aromatic bis(dioxaphosphorinane) is inert to the polycarbonate under conditions of fabrication and use.

The above, relatively new, compounds are among the aromatic bis(organophosphorus) compounds which are of interest in the present invention.

There exists a need for improving the thermal stability of interpolymers of ethylene containing pendent carboxyl groups. It is an object of this invention to meet that need.

SUMMARY OF THE INVENTION

The thermal stability of carboxyl-containing ethylene interpolymers is improved by incorporating therein minor amounts of an aromatic bis(organophosphorus) compound, alone or in combination with a dicarboxylic acid and/or with a hindered phenolic antioxidant.

DETAILED DESCRIPTIONS

Ethylene interpolymers containing carboxyl groups are well known, especially those comprising interpolymers containing ethylene and olefinically unsaturated carboxylic acids, e.g., acrylic acid or methacrylic acid, such as shown in U.S. Pat. No. 3,239,370 and U.S. Pat. No. 3,520,861. The ethylene/acid interpolymers often containing relatively minor amounts of other polymerizable olefins, such as propylene, butene, hexene, octene and the like.

Other ethylene polymers containing carboxyl groups are known, such as those prepared by grafting unsaturated carboxylic acids onto ethylene polymer chains.

Suitable monomers for use in incorporating carboxyl groups into ethylene polymers are, e.g., acrylic acid, methacrylic acid, crotonic acid, 3-methyl 2-butenoic acid, alkyl acrylates, vinyl acetate, and the like. The carboxylic groups may be provided by monomers conforming substantially to those represented by the empirical formula

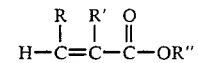

where R and R' are, independently, hydrogen or methyl groups and R" is hydrogen or alkyl groups of 1–10 carbon atoms. Other carboxylates are provided by monomers conforming substantially to the empirical vinyl alkylate formula

where R is preferably an alkyl group of 1–4 carbon atoms. One or more of such carboxyl containing monomers may be used to provide about 0.01 to about 60% by weight of the ethylene polymer. The carboxyl-containing polymers may exhibit melt flows of from 0.01 gm/10 min. as measured by ASTM-D-1238, Condition E, to about 500 gm/10 min. as measured by ASTM-D-1238, condition B; i.e., they range from very high mol. wt to very low mol. wt.

The dicarboxylic acid additives of the present invention conform generally to the empirical formula:

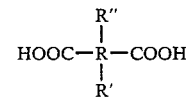

where R represents an aliphatic ($C_0$ to $C_{24}$) or aromatic radical; R' and R" each independently, represent amino, mercapto, phosphato, carboxyl, or hydroxyl groups or other nucleophilic groups or hydrogen groups. Where R is $C_0$, then the compound is HOOC—COOH and there are no R' and R" groups. Where R is from $C_1$ to $C_{24}$ there may be only one R' and/or only one R" or there may be a plurality of R' and/or R" groups other than hydrogen. Where R is $C_2$ to $C_{24}$ there may be one or more double-bonds in the carbon chain. The following list of dicarboxylic acids is representative, but not exhaustive of the compounds contemplated within the purview of this invention:

| Name | Formula |
|---|---|
| oxalic | HOOC—COOH |
| malonic | HOOC—$CH_2$—COOH |
| succinic | HOOC—$CH_2$—$CH_2$—COOH |
| tartaric | HOOC—CH(OH)—CH(OH)—COOH |
| glutaric | HOOC—$(CH_2)_3$—COOH |
| adipic | HOOC—$(CH_2)_4$—COOH |
| pimelic | HOOC—$(CH_2)_5$—COOH |
| suberic | HOOC—$(CH_2)_6$—COOH |
| azelaic | HOOC—$(CH_2)_7$—COOH |
| sebacic | HOOC—$(CH_2)_8$—COOH |
| maleic | HOOC—CH=CH—COOH |
| acetone dicarboxylic | HOOC—$CH_2$—CO—$CH_2$—COOH |
| malic | HOOC—CHOH—$CH_2$—COOH |

| Name | Formula |
|---|---|
| phthalic | HOOC—⌬—COOH |

Other substituted or unsubstituted bis-dicarboxylic polymethylenes will become apparent to practitioners of the relevant arts.

The aromatic bis(organophosphorus) compounds for use in the present invention conform, generally, to at least one of the following empirical structures,

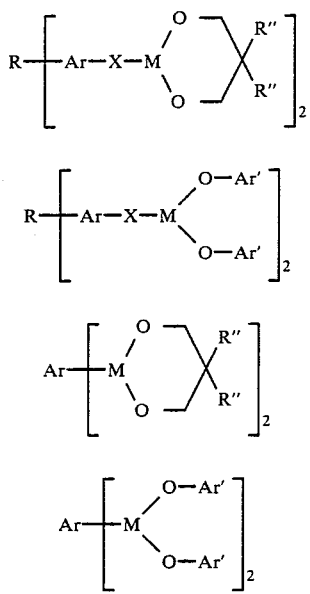

where,

X is O—R'—O or R';

R' is an alkylene or alkylidene of $C_1$–$C_8$, such as methylene, ethylene, propylene, propylidene and the like;

R is an alkylene or alkylidene of $C_1$–$C_8$, such as R' or may be an ether or thioether or polyether such as alkyleneoxyalkylene, alkylenethioalkylene, poly-(alkyleneoxy)alkylene, poly(alkylenethio)alkylene, and the like;

Ar represents biphenylene or phenylene whether substituted or not and where any such substituent groups may be halo, amino, or alkyl of $C_1$–$C_8$ such as methyl, ethyl, propyl, butyl, t-butyl, hexyl, and the like;

Ar' may be, independently of each other, any of the Ar groups described above,

R'' represents alkyl groups of $C_1$–$C_8$, such as methyl butyl, hexyl, and the like including substituted alkyls such as haloalkyl or amino alkyl;

M represents P, P=O, or P=S.

For the sake of conciseness, the above compounds are referred to in this disclosure as "aromatic bis(organophosphorus) compounds".

Some representative compounds are:
(a) 2,2'-[(1-methylidene) bis (4,1-phenylene oxy-2,1-ethane diyloxy)] bis 5,5-dimethyl-1,3,2-dioxaphosphorinane
(b) 2,2'-[(1-methyl ethylidene) bis (4,1-phenylene-oxy-2,1-ethane diyloxy)] bis 5,5'-dimethyl-1,3,2-oxo phosphate
(c) 2,2'-](1-methyl ethylidene) bis (4,1-phenylene-oxy-2,1-ethane diyloxy)] bis 5,5'-dimethyl-1,3,2,-thio phosphate
(d) 2,2'-[(1-methyl ethylidene) bis (4,1-phenylene-oxy-1-methyl-2,1-ethane diyloxy)] bis 5,5'-dimethyl-1,3,2-dioxaphosphorinane
(e) tetrakis (2,4-di-tert-butyl phenyl)4,4'-biphenylene diphosphonite
and the like.

The hindered phenols for use in the present invention generally conform to empirical structures illustrated by, for example,

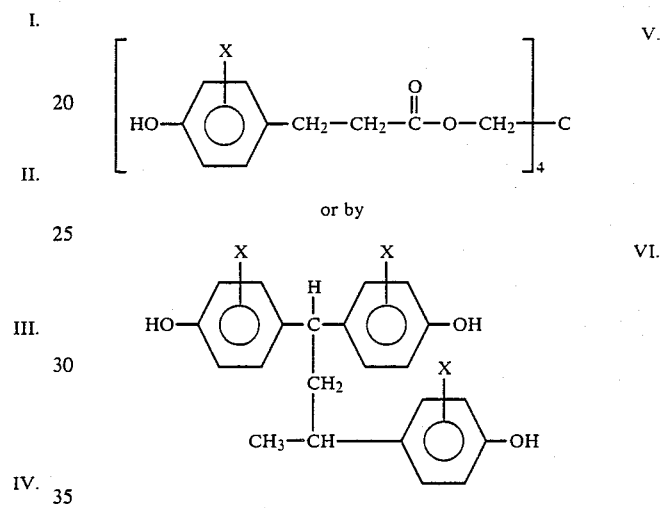

and the like, where X represents one or more alkyl groups, such as
(a) 1,3,5-trimethyl-2,4,6-tris(3',5'-di-tert-butyl-4'-hydroxyl benzyl) benzene
(b) 2,2'-oxamidobisethyl, 3(3',5'-di-tert-butyl-4-hydroxyl phenyl) propionate
(c) tetrakis [methylene-3-(3',5'-di-tert-butyl-4'-hydroxyl-phenyl) propionate] methane
(d) 1,1,3-tris-(2'-methyl-4'-hydroxy-5'-tert-butyl phenyl) butane
(e) 2,6-di-tert-butyl-4-ethyl phenol
(f) 2,2'-oxamidobis ethyl-3(3',5'-di-tert-butyl-4-hydroxyl phenyl) propionate
(g) tris (4-tert-butyl-3-hydroxy-2,6-dimethyl benzyl)-2-triazine-2,4,6-(1H,3H,5H) trione
(h) 2,6-di-tert-butyl-4-methyl phenol
(i) octadecyl-3,4-di-tert-butyl-4-hydroxy-hydrocinnamate
and the like.

Suggested operative ranges and preferred ranges (percent by wt.) for the components of the present blends or alloys are as follows:

| Component | Operative | Preferred |
|---|---|---|
| carboxyl-containing polymer | 79–99.9 | 99.7–99.8 |
| hindered phenol | 0.01–3.0 | 0.02–01 |
| aromatic bis(organo-phosphorus) compound | 0.01–3.0 | 0.02–0.1 |
| dicarboxylic acid | 0.01–15 | 0.02–0.1 |

The mixing of the interpolymers with the other components of the present invention may be done by any convenient means, such as by employing a compounding extruder, Banbury mixer, intensive mixers, or multi-screw mixing extruder, or any combination thereof, preferably by masterbatch concentrates letdown to the desired additive concentrations in an extruder equipped with one or more mixing screws.

In accordance with ordinary goals sought in polymer blending, or polymer alloying, one seeks to distribute additives substantially uniformly through the base resin.

The Oxidative Induction Period is measured by an oxygen-uptake apparatus similar to that described by Grieveson in Society of Chemical Industries, Monograph No. 13, 1961, pp. 413–431, published in London, England, and the Gardner Yellowness Index is measured by a Gardner XL-23 colorimeter according to ASTM-D-1925.

The following examples are for illustration of various embodiments, but the present invention is not limited to the particular embodiments shown.

EXAMPLE 1

An ethylene/acrylic acid copolymer prepared by free-radical initiation in a stirred autoclave under high ethylene pressure and high temperature was used in the example. The copolymer contained 6.5% by weight of acrylic acid units and had a melt flow of 2 gm./10 minutes as measured by ASTM-D-1238 condition E. Small particles of the copolymer were dry-blended with 0.25% tartaric acid and then compounded at 350° F. (~177° C.) on a 2½ inch, 20/1 L/D compounding extruder equipped with a metering, compression and mixing section. The pelletized product had an oxidative induction period of >60 minutes according to oxygen-uptake analysis at ~149° C. The oxidative induction period at ~149° C. for the base resin without the addition of tartaric acid was 9.0 minutes.

EXAMPLE 2

An ethylene/acrylic acid copolymer containing 6.5% acrylic acid by weight, a melt flow of 2 gm./10 min., and a density of 0.9325 gm/cc was used as the base resin in the following evaluations:

| Run | Stabilizer* | Concentration, ppm | Oxidative Induction Period @ 177° C., minutes |
|---|---|---|---|
| 1 | None | — | 3.5 |
| 2 | I | 2500 | 15.0 |
| 3 | II | 2500 | 11.0 |

*I is tartaric acid
II is a 2:1 physical blend of 1,1,3-tris(2'-methyl-4'-hydroxy-5'-tert-butyl phenyl)butane and distearylthiodipropionate (a thioester stabilizer).

The above evaluation indicated that at an equivalent concentration, tartaric acid out-performed a conventional hindered phenol-thioester composition.

EXAMPLE 3

An ethylene/acrylic acid copolymer containing 6.5% acrylic acid, having a melt flow of 5.5 gm/10 min. and a density of 0.9325 gm/cc was used in the following evaluation.

| Run | Additive A* ppm | Additive B** ppm | Oxidative Induction Period @ 177° C., mins. |
|---|---|---|---|
| 1 | None | None | 7.0 |
| 2 | 1000 | None | 21.0 |
| 3 | None | 1000 | 39.0 |
| 4 | 500 | 500 | 48.0 |

*A is 1,1,3-tris-(2'-methyl-4-hydroxyl-5'-tert-butyl phenyl) butane
**B is tartaric acid The above evaluation indicated that a hindered phenol-dicarboxylic acid composition is highly synergistic.

EXAMPLE 4

Using the same copolymer as in Example 3, the following evaluation was performed:

| Run | Additive A* ppm | Additive B** ppm | Oxidative Induction Period @ 177° C., mins. |
|---|---|---|---|
| 1 | None | None | 7.0 |
| 2 | 1000 | None | 21.0 |
| 3 | None | 1000 | 35.0 |
| 4 | 500 | 500 | 78.0 |

*Additive A is 1,1,3-tris-(2'-methyl-4-hydroxyl-5'-tert-butyl phenyl) butane.
**Additive B is 2,2'-[(1-methylidene) bis (4,1-phenylene oxy-2,1-ethane diyloxy)] bis 5,5-dimethyl-1,3,2-dioxaphosphorinane.

This evaluation showed that a hindered phenol-/aromatic bis(organophosphorus) composition is also highly synergistic.

EXAMPLE 5

Using the same copolymer as in Example 3 the following evaluation was conducted.

| Run | Stabilizer* | Concentration ppm | Oxidative Induction Period @ 177° C., mins. |
|---|---|---|---|
| 1 | A | 1000 | 23.0 |
| 2 | B | 1000 | 39.0 |
| 3 | C | 1000 | 21.0 |
| 4 | D | 1000 | 35.0 |
| 5 | E | 1000 | >143.0 |
| 6 | — | — | 7.0 |

*A is tetrakis [methylene 3-(3',5'-di-tert-butyl-4'-hydroxyl phenyl) propionate] methane
B is tartaric acid
C is 1,1,3-tris-(2'-methyl-4-hydroxyl-5'-tert-butylphenyl) butane
D is 2,2'-[(1-methylidene) bis (4,1-phenylene oxy-2,1-ethane diyloxy)] bis 5,5'-dimethyl-1,3,2-dioxaphosphorinane
E is tetrakis (2,4-di-tert butyl phenyl)4,4'-biphenylene diphosphonite.

The above evaluation showed that at equivalent concentrations the dicarboxylic acid and the aromatic bis-(organophosphorus) compound were more effective thermal stabilizers than either of the conventional hindered phenol stabilizers.

EXAMPLE 6

Using the same copolymer as in Example 3 the following multiple-extrusion evaluation was performed.

| Run | Stabilizer** A, ppm | Other Stabilizer Identity | ppm | $\sigma_{mi}$* | $\Sigma_{mi}$* |
|---|---|---|---|---|---|
| 1 | None | None | None | 0.147 | — |
| 2 | 500 | B | 500 | 0.087 | 41.06 |
| 3 | 500 | C | 500 | 0.097 | 34.33 |
| 4 | 500 | D | 500 | 0.137 | 7.08 |

-continued

| Run | Stabilizer** A, ppm | Other Stabilizer Identity | ppm | $\sigma_{mi}$* | $\Sigma_{mi}$* |
| --- | --- | --- | --- | --- | --- |
| 5 | 500 | E | 500 | 0.176 | −19.67 |

*$\sigma_{mi}$ is the standard deviation in melt indices of each sample extruded five times at 204° C. on the aforementioned extruder. $\Sigma_{mi}$ is the percent melt stability relative to the base resin in this evaluation and was calculated from:

$$\Sigma_{mi} = \frac{\sigma_o - \sigma_i}{\sigma_o} \times 100$$

Where $\sigma_o$ was the $\sigma_{mi}$ of the unstabilized base resin and $\sigma_i$ was the $\sigma_{mi}$ of each stabilized sample independently.
**A is tetrakis [methylene 3-(3′,5′-di-tert-butyl-4′-hydroxylphenyl) propionate] methane
B is 2,2′-[(1-methylidene) bis (4,1-phenylene oxy-2, 1-ethane diyloxy)] bis 5,5′-dimethyl-1,3,2-dioxa-phosphorinane
C is tartaric acid
D is tris-(mixed mono-and dinonyl phenyl) phosphite
E is thiobis (6-tert-butyl-3-methyl phenol).

The above multiple-extrusion evaluation indicated that phenolic/aromatic bis(organophosphorus) compound and phenolic/dicarboxylic acid compositions offer exceptional process stability in contrast to conventional phosphite and thio-bisphenol compositions which offer little or no stability, or may even adversely affect polymer stability.

EXAMPLE 7

In this evaluation an ethylene/acrylic acid copolymer containing 6.5% by wt. acrylic acid, having a melt flow of 9.0 gm/10 min. and a density of 0.9325 gm/cc was used.

| Run | Stabilizer* | Conc. ppm | $\Sigma_{mi}$ |
| --- | --- | --- | --- |
| 1 | None | None | — |
| 2 | A | 1000 | 16.2 |
| 3 | B | 1000 | 72.5 |
| 4 | C | 1000 | 43.8 |

*A is tetrakis [methylene 3-(3′,5′-di-tert-butyl-4-hydroxylphenyl) propionate] methane
B is 2,2′-[(1-methylidene) bis (4,1-phenylene oxy-2,1-ethane diyloxy)] bis 5,5′-dimethyl-1,3,2-dioxa-phosphorinane
C is tartaric acid The above evaluation showed that at equivalent concentrations the dicarboxylic acid and the aromatic bis(organophosphorus) compound were significantly more effective process stabilizers than the conventional hindered phenol.

EXAMPLE 8

Following the multiple-extrusion evaluations of Example 6 above, Gardner Yellowness Index determinations of the samples were made according to ASTM-D-1925.

| Stabilizer* | | | | Gardner Yellowness Index, Pass: | | | | |
| --- | --- | --- | --- | --- | --- | --- | --- | --- |
| Run | A, ppm | B, ppm | C, ppm | D, ppm | 0 | 1 | 2 | 3 | 4 |
| 1 | 1000 | — | — | — | −3.4 | 6.2 | 6.4 | 8.97 | 11.7 |
| 2 | 500 | — | 500 | — | −3.4 | −2.8 | −1.2 | 0.54 | 4.03 |
| 3 | 500 | 500 | — | — | −2.06 | −0.85 | 0.75 | 1.88 | 3.34 |
| 4 | 500 | — | — | 500 | −0.90 | −0.25 | 0.50 | 1.56 | 3.07 |

*Stabilzers A, B, and C are same as in Example 6.
Stabilizer D is same as E in Example 5.

This evaluation showed that the dicarboxylic acid and the aromatic bis(organophosphorus) compound compositions imparted good color stability to an ethylene/acrylic acid copolymer while a conventional hindered phenol stabilizer imparted less than acceptable color stability as denoted by the relatively high measurement, 11.7; the higher the value the more objectionable the color.

EXAMPLE 9

Using the same base resin as in Example 7 above the following evaluation was made.

| | Stabilizer* | | | |
| --- | --- | --- | --- | --- |
| Run | A, ppm | B, ppm | C, ppm | $\Sigma$mi |
| 1 | 500 | 500 | — | 30.8 |
| 2 | 500 | 250 | 250 | 72.2 |

*A is 1,1,3-tris-(2′-methyl-4-hydroxyl-5′-tert-butyl phenyl) butane.
B is tetrakis (2,4-di-tert-butyl phenyl) 4,4′-biphenylene diphosphonite.
C is 2,2′-[(1-methylidene)bis(4,1-phenylene oxy-2,1-ethane diyloxy)]bis 5,5-dimethyl-1,3,2-dioxaphosphorinane.

This evaluation showed that the combination of two aromatic bis(organophosphorus) compounds and a hindered phenolic antioxidant was very effective.

EXAMPLE 10

Using the same base resin as in Example 7 above the following evaluation was made:

| | Stabilizer* | | | |
| --- | --- | --- | --- | --- |
| Run | A, ppm | B, ppm | C, ppm | $\Sigma$mi |
| 1 | 500 | 500 | — | 30.8 |
| 2 | 500 | 250 | 250 | 58.1 |
| 3 | — | 1000 | — | 19.1 |
| 4 | 1000 | — | — | 16.1 |

*A is 1,1,3-tris-(2′-methyl-4-hydroxyl-5′-tert-butyl phenyl) butane.
B is tetrakis (2,4-di-tert-butyl phenyl)4,4′-biphenylene diphosphonite.
C is tartaric acid.

This evaluation showed that the combination of a dicarboxylic acid, an aromatic bis(organophosphorus) compound, and a hindered phenol antioxidant significantly improved the process stability of a carboxyl-containing ethylene interpolymer. The evaluation also illustrated another synergistic aromatic bis(organophosphorus) compound/hindered phenol composition.

Within the purview of the present invention, dicarboxylic acids and aromatic bis(organophosphorus) compounds, such as described herein, significantly improve the thermal-oxidative and color stability of carboxyl-containing ethylene interpolymers during their manufacturing processes, storage, fabrication, and end-usage. The applications of such heat stable ethylene interpolymers include such things as extrusion films (e.g., for paper, paperboard, metallic substrates, etc.), blister packages, flexible packages, adhesives (hot melts), primers, binders, laminates, adhesive composite structures, barrier films, metallized films, injection molded articles, rotomolded articles, wire and cable insulation, shielding tapes, powder molding, and the like, including those embodiments wherein the polymers contain colorants, pigments, or fillers. Fillers include such things as silica, calcium carbonate, metal oxides, talc, clay, sawdust, rice hulls, wood flour, starch, ground bark, and the like.

We claim:

1. A composition of matter comprising an ethylene/acrylic acid or ethylene/methacrylic acid interpolymer having incorporated therein a minor amount of at least one aromatic bis(organophosphorous) compound selected from those conforming to the formulae

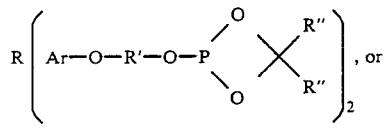 I.

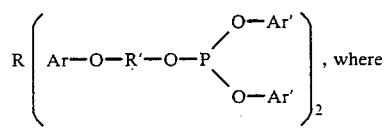 II.

R' is an alkylene or alkylidene of $C_1-C_8$,

R is an alkylene or alkylidene of $C_1-C_8$, including those having one or more ether or thioether groups in the molecule, Ar represents biphenylene or phenylene, whether substituted or not, Ar' represents, independently of each other, any of the Ar groups described above, R' represents alkyl groups of $C_1-C_8$, including those represented by R and R' described above, and, in addition thereto, a minor amount of at least one hindered phenolic antioxidant and/or a minor amount of at least one dicarboxylic acid of the formula

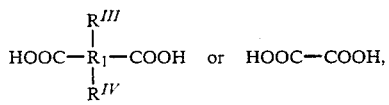

where $R_1$ represents an aliphatic or aromatic grouping containing $C_1$ to $C_{24}$, $R^{III}$ and $R^{IV}$ each, independently, represent amino, mercapto, phosphate, carboxyl, or hydroxyl group or hydrogen.

2. The composition of claim 1 wherein the amount of the aromatic bis(organophosphorus) compound is in the range of about 0.01% to about 3% by weight of the interpolymer.

3. The composition of claim 1 wherein the aromatic bis(organophosphorus) compound is at least one of formula I.

4. The composition of claim 1 wherein the aromatic bis(organophosphorus) compound is at least one of formula II.

5. The composition of claim 1 wherein the interpolymer comprises ethylene interpolymerized with acrylic acid.

6. The composition of claim 1 wherein the said additional ingredient comprises a minor amount of at least one hindered phenolic antioxidant.

7. The composition of claim 1 wherein the said additional ingredient comprises about 0.01% to about 3% by weight of at least one hindered phenol compound conforming to the formula

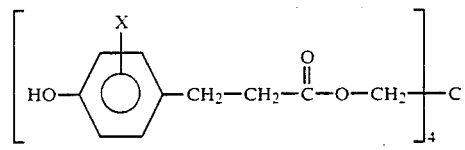

or

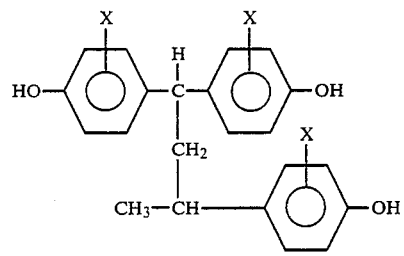

where X represents one or more alkyl groups.

8. The composition of claim 1 wherein the said additional ingredient comprises at comprises least one dicarboxylic acid of the empirical formula

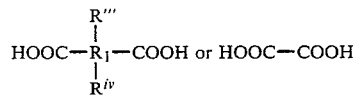

where $R_1$ represents an aliphatic or aromatic grouping containing $C_1$ to $C_{24}$, $R^{III}$ and $R^{IV}$ each, independently, represent amino, mercapto, phosphato, carboxyl, or hydroxyl group or hydrogen.

9. A method for improving the thermal stability of ethylene/acrylic acid or ethylene/methacrylic acid interpolymers, said method comprising incorporating into said interpolymers a minor amount of at least one aromatic bis(organophosphorous) compound selected from those conforming to the formulae

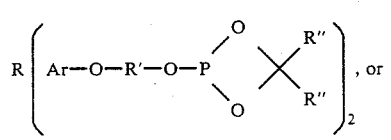 I.

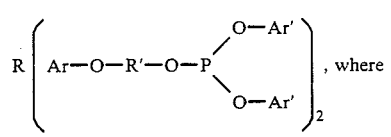 II.

R' is an alkylene or alkylidene of $C_1-C_8$,

R is an alkylene or alkylidene of $C_1-C_8$, including those having one or more ether or thioether groups in the molecule, Ar represents biphenylene or phenylene, whether substituted or not, Ar' represents, independently of each other, any of the Ar groups described above, R" represents alkyl groups of $C_1-C_8$, including those represented by R and R' described above, and, in addition thereto, a minor amount of at least one hindered phenolic antioxidant and/or a minor amount of at least one dicarboxylic acid of the formula

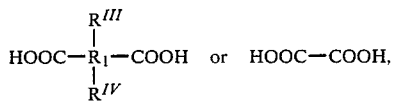

where $R_1$ represents an aliphatic or aromatic grouping containing $C_1$ to $C_{24}$, $R^{III}$ and $R^{IV}$ each, independently, represent amino, mercapto, phosphate, carboxyl, or hydroxyl group or hydrogen.

10. The method of claim 9 wherein the amount of the aromatic bis(organophosphorus) compound is in the range of about 0.01% to about 3% by weight of the interpolymer.

11. The method of claim 9 wherein the aromatic bis(organophosphorus) compound is at least one of formula I.

12. The method of claim 9 wherein the aromatic bis(organophosphorus) compound is at least one of formula II.

13. The method of claim 9 wherein the interpolymer comprises ethylene interpolymerized with acrylic acid.

14. The method of claim 9 wherein the said additional ingredient comprises a minor amount of at least one hindered phenolic antioxidant.

15. The method of claim 9 wherein the said additional ingredient comprises about 0.01% to about 3% by weight of at least one hindered phenol compound conforming to the formula

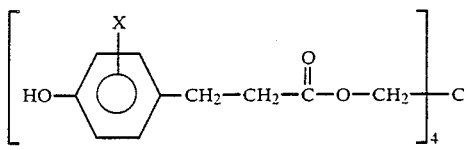

or

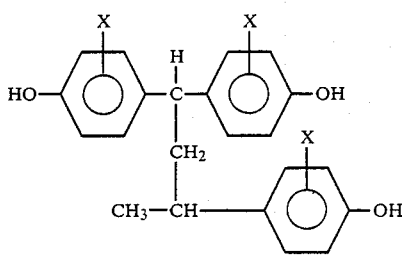

where X represents one or more alkyl groups.

16. The method of claim 1 wherein the said additional ingredient comprises at least one dicarboxylic acid of the empirical formula

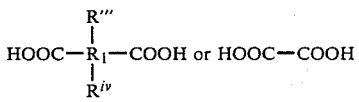

where $R_1$ represents an aliphatic or aromatic grouping containing $C_1$ to $C_{24}$, $R^{III}$ and $R^{IV}$ each, independently, represent amino, mercapto, phosphato, carboxyl, or hydroxyl group or hydrogen.

* * * * *

UNITED STATES PATENT AND TRADEMARK OFFICE
CERTIFICATE OF CORRECTION

PATENT NO. : 4,500,664
DATED : February 19, 1985
INVENTOR(S) : Osborne Kelly McKinney and David Perez Flores It is certified that error appears in the above-identified patent and that said Letters Patent is hereby corrected as shown below:

Col. 4, line 4; "2,2'-](1-methyl" the bracket is facing the wrong direction, should be --2,2'-[(1-methyl--.

Col. 4, line 41; "hydroxyl" should read --hydroxy--.

Col. 7, line 61; "Stabilzers" should read --Stabilizers--.

Col. 9, line 31; "R'" should read --R"--.

Col. 10, line 24; second occurrence of "comprises" should be removed.

Col. 10, line 65; "c8" should read --$C_8$--.

Col. 11, lines 11, 12 and 13; there is no need for italics.

Signed and Sealed this

Twentieth Day of August 1985

[SEAL]

Attest:

DONALD J. QUIGG

Attesting Officer    Acting Commissioner of Patents and Trademarks